US006500794B1

(12) United States Patent
Yamaguchi et al.

(10) Patent No.: US 6,500,794 B1
(45) Date of Patent: Dec. 31, 2002

(54) GRANULATED BLEACHING ACTIVATOR

(75) Inventors: Nobuyoshi Yamaguchi, Wakayama (JP); Hiroshi Noro, Wakayama (JP); Shigeaki Fujinami, Wakayama (JP); Masakazu Furukawa, Wakayama (JP); Kazuyoshi Ozaki, Wakayama (JP); Masataka Maki, Wakayama (JP); Nobuyuki Ogura, Wakayama (JP); Muneo Aoyagi, Wakayama (JP)

(73) Assignee: Kao Corporation, Tokyo (JP)

( * ) Notice: Subject to any disclaimer, the term of this patent is extended or adjusted under 35 U.S.C. 154(b) by 0 days.

(21) Appl. No.: 09/553,562

(22) Filed: Apr. 20, 2000

(30) Foreign Application Priority Data

Jun. 18, 1999 (JP) .......................................... 11-172898
Apr. 20, 2000 (JP) .......................................... 11-111868

(51) Int. Cl.[7] ............................ A62D 3/00; C09K 3/00; C11D 3/00; C11D 7/54; C11D 17/00

(52) U.S. Cl. ....................... 510/376; 510/349; 510/441; 252/186.25; 252/186.27

(56) References Cited

U.S. PATENT DOCUMENTS

| | | | |
|---|---|---|---|
| 4,399,049 A | 8/1983 | Gray et al. | |
| 4,483,778 A | 11/1984 | Thompson et al. | |
| 4,486,327 A | 12/1984 | Murphy et al. | |
| 4,678,594 A | 7/1987 | Parfomak et al. | |
| 5,002,687 A | 3/1991 | Roberts et al. | |
| 5,458,801 A | * 10/1995 | Oyashiki et al. | 252/186.25 |
| 5,795,854 A | 8/1998 | Angell et al. | |

FOREIGN PATENT DOCUMENTS

| | | |
|---|---|---|
| EP | 0106634 A | 4/1984 |
| GB | 2239656 A | 7/1991 |
| JP | B5440 | 1/1983 |

OTHER PUBLICATIONS

Database WPI, Class D25, AN 1990–352920 XP002146660 & JP 02 255800 Oct. 16, 1990.

* cited by examiner

*Primary Examiner*—Yogendra N. Gupta
*Assistant Examiner*—John M. Petruncio
(74) *Attorney, Agent, or Firm*—Birch, Stewart, Kolasch & Birch, LLP

(57) ABSTRACT

The present invention provides a granulated bleaching activator having a high solubility, that is, a granulated bleaching activator comprising (a) a bleaching activator and (b) at least one nonionic surfactant selected from the group consisting of a nonionic surfactant (b1) having a melting point less than 20° C. and an alkylene oxide addition type nonionic surfactant (b2) having a melting point less than 20° C., (b1) fulfilling the specific requirements concerning solubility, in a specific ratio.

6 Claims, No Drawings

GRANULATED BLEACHING ACTIVATOR

FIELD OF THE INVENTION

The present invention relates to a granulated bleaching activator and a bleaching agent.

PRIOR ART

Various bleaching activators have been proposed to heighten the bleaching effect of oxygenic bleaching agents such as sodium percarbonate (hereinafter referred to as "PC") and sodium perborate (hereinafter referred to as "PB"). The function of the bleaching activator is drastically impaired by an interaction with an oxygenic bleaching agent or other components incorporated into a detergent, during storage. Therefore, the bleaching activator must have a high storage stability. Also, it is required for the bleaching activator to possess a high solubility in the case of washing with a weak stirring power in cold water or soaking-thorough.

JP-B 5-440 discloses a granulation method in which a bleaching activator is mixed with an ethoxylated nonionic surfactant and the resulting mixture is extruded through an open screen. The granules obtained in this method are relatively quickly dissolved in water in the condition of washing in hot water, but dissolved slowly in the condition of cold water. Therefore the function of the bleaching activator can not be sufficiently realized.

Meanwhile, in the case of hard dirt or soil, soak washing is undergone in the presence of an oxygenic bleaching agent and the above bleaching activator used for the purpose of improving the bleaching effect. However, when the concentration of the above bleaching activator is high, the generating rate of organic peroxide is extremely reduced and it is impossible to obtain a satisfactory bleaching effect.

DISCLOSURE OF THE INVENTION

Accordingly, it is an object of the present invention to provide a granulated bleaching activator having a high solubility and also to provide a bleaching agent having a high bleaching effect even when the concentration of the bleaching activator is high.

The invention provides a granulated bleaching activator comprising:

(a) 30–96% by weight of a bleaching activator and (b) 1–10% by weight of at least one nonionic surfactant selected from the group consisting of a nonionic surfactant (b1) having a melting point being less than 20° C. and an alkylene oxide-added nonionic surfactant (b2) having a melting point being less than 20° C., (b1) fulfilling the following requirements (1) and (2):

(1) when 0.1 g of the component (a) is added to an aqueous solution produced by dissolving 10 g of the component (b1) in 500 ml of water at 10° C. and the mixture was stirred for five minutes, the solubility of the component (a) just after the stirring is 50% by weight or more; and (2) when 0.1 g of the component (a) is added to an aqueous solution produced by dissolving 0.25 g of the component (b1) in 500 ml of water at 10° C. and the mixture was stirred for five minutes, the solubility of the component (a) just after the stirring is 20% by weight or less.

It is essential that the component (b1) meets the requirements (1) and (2).

This is the granulated activator composition. It comprises (a) and (b), the balance being a binder.

The invention provides a bleaching agent composition comprising the granulated bleaching activator (I) as defined above and an inorganic peroxide (II).

It is preferable that the component (a) is at least one selected from the group consisting of an alkanoyl- or alkenoyl-oxybenzenecarboxylic acid having 8 to 14 carbon atoms in the alkanoyl or alkenoyl group or a salt thereof and an alkanoyl- or alkenoyl-oxybenzene sulfonate having 8 to 14 carbon atoms in the alkanoyl or alkenoyl group.

It is preferable that the component (b) is a polyoxyalkylenealkyl or polyoxyalkylenealkenyl ether represented by the following formula (i):

$$RO—(PO)_m—(EO)_n—H \qquad (i)$$

wherein R represents a $C_{10-18}$ alkyl or alkenyl group, m and n independently represent a number of from 1 to 20, PO represents propyleneoxy group and EO represents ethyleneoxy group, provided that PO and EO may be added in block or at random.

The weight ratio of (a) to (b) may be in the range of 15/1 to 70/1.

The bleaching agent may further comprise (III) particles including a surfactant.

The invention provides a method of activating a bleaching agent with the granulated bleaching activator as defined above and use of the granulated bleaching activator as defined above to activate a bleaching agent.

DETAILED DESCRIPTION OF THE INVENTION

Granulated Bleaching Activator

Component (a)

Examples of the bleaching agent as the component (a) include, though not particularly limited thereto, tetraacetylethylenediamine, glucose pentaacetate, uryl tetraacetyl glycolate, alkanoyl- or alkenoyl-oxybenzenecarboxylic acid having 8 to 14 carbon atoms in the alkanoyl or alkenoyl group or a salt thereof and alkanoyl- or alkenoyl-oxybenzene sulfonate having 8 to 14 carbon atoms in the alkanoyl or alkenoyl group. Among these compounds, at least one selected from alkanoyl- or alkenoyl-oxybenzenecarboxylic acid having 8 to 14 carbon atoms, preferably 10 to 10 carbon atoms in the alkanoyl or alkenoyl group from a viewpoint of bleaching effect or a salt thereof and alkanoyl- or alkenoyl-oxybenzene sulfonate having 8 to 14 carbon atoms, preferably 10 to 10 carbon atoms in the alkanoyl or alkenoyl group from a viewpoint of bleaching effect are preferred. Decanoyloxybenzenecarboxylic acid or its sodium salt and sodium dodecanoyloxybenzene sulfonate are particularly preferred. As the component (a), it is preferable to use those having a powder form. The bulk density thereof is 0.3 to 0.7 g/ml and particularly preferably 0.35 to 0.6 g/ml. Also it is advantageous that the component (a) contains particles having a grain size of 125 μm or more in an amount of 15% by weight or less and particularly preferably 10% by weight or less in the bleaching activator.

Although the component (a) used in the present invention exhibits sufficiently satisfactory solubility in usual washing conditions, the generating rate of an organic peroxide is extremely reduced when the concentration of the component (a) in the washing water is as high as exceeding 0.1% by weight. In the present invention, a nonionic surfactant (b1) having a melting point less than 20° C. and an alkylene oxide-added nonionic surfactant (b2) having a melting point less than 20° C., (b1) fulfilling both of the above-mentioned requirements (1) and (2), are incorporated into the granule as the component (b) in a specific ratio, whereby a reduction in the generating rate of an organic peroxide can be restrained. This is considered to be because, in the case of, for instance, alkanoyl- or alkenoyl-oxybenzenecarboxylic acid or salts thereof or alkanoyl- or alkenoyl-oxybenzene sulfonate, the formation of diacyloyl peroxide is a main reaction when its concentration is high. In order to avoid this, it is effective to use, as a solubilizing agent for the bleaching activator, a surfactant which sufficiently solubilizes the bleaching activator in the first stage when the bleaching activator dissolves and is reduced in its solubilizing ability as it is diluted.

Herein, the solubility was measured using the following method.

Method for Measuring Solubility 1 l glass beaker (cylinder type; inside diameter: 105 mm, height: 15 cm) was charged with 500 ml of an aqueous solution in which the component (b1) was dissolved in an amount corresponding to the requirements (1) and (2) and the solution was stirred (using a magnetic stirrer; a cylindrical stirrer piece with a diameter of 15 mm and a length of 52 mm, 200 rpm) in a thermostat kept at 10° C. At the stage in which the temperature of the solution reached 10° C., the powdery component (a) having a bulk density of 0.4 to 0.5 g/l and containing 10% by weight or less of particles with a grain size of 125 $\mu$m was added thereto in a prescribed amount and then the solution was stirred for 5 minutes. Thereafter, the solution was filtered through a membrane filter (Cellulose Nitrate A045A047A, 0.47 $\mu$m, manufactured by ADVANTEC) and the content of the component (a) in the filtrate was determined by using high performance liquid chromatography to determine the solubility by the following formula.

$$\text{Solubility (\%)} = \frac{\text{the content of the component (A) in the filtrate}}{\text{the amount of the component (A) added}} \times 100$$

Component (b)

In the present invention, as the component (b), at least one nonionic surfactant selected from the nonionic surfactant (b1) having a melting point less than 20° C. and an alkylene oxide-added nonionic surfactant, preferably an ethylene oxide- and/or propylene oxide-added nonionic surfactant, having a melting point less than 20° C., (b1) fulfilling the requirements (1) and (2) described above, is used. Particularly, the component (b) is preferably selected from the nonionic surfactants represented by the following formula (i):

$$RO—(PO)_m—(EO)_n—H \quad (i)$$

wherein R represents an alkyl or alkenyl group having 10–18 and preferably 10–14 carbon atoms, m and n independently represent a number of 1–20, preferably 1–10 and more preferably 2–10, PO represents a propyleneoxy group and EO represents an ethyleneoxy group, provided that PO and EO may be added in block and at random.

Among these nonionic surfactants, particularly the compounds represented by the following formula (i-1) are preferable from a viewpoint of bleaching effect.

$$RO—(EO)_p—(PO)_q—(EO)_r—H \quad (i\text{-}1)$$

wherein R, EO and PO have the same meanings as defined above, p represents 0–10 and preferably 1–7, q represents 1–10 and preferably 1–5 and r represents 0–10 and preferably 1–7, provided that the case both p and r are 0 is excluded.

Examples of compounds which may be used as the component (b) include nonionic surfactants (EO-added non ions) in which EO is added to alcohol (specifically, Emulgen 507 (an adduct of $C_{12}/C_{13}$ mixed alcohol with 7 mols of EO, manufactured by KAO Corp., Emulgen 109P (an adduct of $C_{12}$ alcohol with 9.2 mols of EO, manufactured by KAO Corp. or the like) and nonionic surfactants (EO/PO addition non ions) in which EO and PO is added to alcohol (specifically, Emulgen KS-108 (an adduct of $C_{12}$ alcohol with EO (5 mols), PO (2 mols) and EO (3 mols), manufactured by KAO Corp., Emulgen LS-106 (an adduct of $C_{12}$ alcohol with EO (2.5 mols), PO (1.5 mols) and EO (3 mols), manufactured by KAO Corp. or the like). EO/PO addition non ions are preferred from a viewpoint of improving the solubility.

When, in the activator composition of the present invention, the content of the component (a) is 30 to 96% by weight, preferably 50 to 96% by weight and more preferably 60 to 90% by weight and the content of the component (b) is 1 to 10% by weight and preferably 2 to 8% by weight, a granulated bleaching activator having a high solubility can be obtained. Also when the weight ratio the component (a) to the component (b), namely (a)/(b) is in the range of from 15/1 to 70/1, preferably from 15/1 to 50/1, a high bleaching effect can be obtained in the system in which the concentration of the bleaching activator is high, and the solubility of the component (a) is improved.

Component (c)

In the granule of the present invention, a solid or powder acid may be incorporated as the component (c). The component (c) is used as a stabilizer for the bleaching activator. Examples of the component (c) include formic acid, succinic acid, maleic acid, fumaric acid, citric acid, glycolic acid, p-hydroxybenzoic acid, phosphoric acid and solid state zeolite exhibiting acid. Among these compounds, succinic acid and citric acid are preferable. In this case, the acid may form a salt with a counter ion including an alkaline metal ion or ammonium ion.

The content of the component (c) in the granule of the present invention is preferably 0.01 to 20% by weight, more preferably 1 to 15% by weight and particularly preferably 1 to 10% by weight. When the content is in this range, the component (c) can fulfill an excellent function as the stabilizer for the bleaching activator.

Component (d)

Besides the above components (a) and (b) or the components (a) to (c), for example, a water-soluble polymer may be added as a component (d) to the granule of the present invention to improve granulation. Here, the water solubility of the aqueous polymer at 20° C. is preferably 60% or more and more preferably 80% or more. Also, the molecular weight thereof is preferably 600 or more (though excluding those corresponding to the component (b)). Moreover, the melting thereof is preferably 20° C. or more. Specific examples of the aqueous polymer include polyethylene glycol and polypropylene glycol. The molecular weight of the polyethylene glycol and polypropylene glycol is preferably 600 to 20000, and more preferably 1000 to 10000.

Although the content of the component (d) in the granule of the present invention is not particularly limited, the content is preferably 2 to 30% by weight and more preferably 10 to 25% by weight to obtain a granule having good granulation and high solubility.

Other Components

It is desirable to incorporate an anionic surfactant, particularly at least one selected from alkyl sulfates and alkyl ether sulfates in an amount of 0 to 50% by weight, preferably 1 to 45% by weight and more preferably 5 to 40% by weight to improve the solubility of the component (a) in a washing bath more greatly. As alkyl sulfates, sodium salts having 10–18 carbon atoms are preferred and specifically, sodium lauryl sulfate or sodium myristyl sulfate is preferred. As alkyl ether sulfates, polyoxyethylenealkyl ether sulfates in which the alkyl group has 10–18 carbon atoms are preferred and also sodium salts are desirable. Here, the polymerization degree of a polyoxyethylene (POE) is 1 to 10 and preferably 1 to 5. In particular, sodium polyoxyethylene (POE=2–5 in average) lauryl ether sulfate and sodium polyoxyethylene (POE=2–6 in average) myristyl ether sulfate are preferable.

In the present invention, pigments or dyes may be further blended in the granule for coloring from an aesthetic point of view. As such a colorant, phthalocyanine green (e.g., C.I. Pigment 7, 36, 37, 38 etc.) or ultramarine blue (e.g., C.I. Pigment Blue 29 etc.) from a viewpoint of storage stability. The amount incorporated into the granule is preferably 0.01 to 1% by weight and particularly preferably 0.05 to 0.5% by weight.

Further, recontamination inhibitors such as polyvinylpyrrolidone and a solubility-promoting agent such as urea, urea derivatives, thiourea, paratoluene sulfonate or water-soluble inorganic salts maybe added. In addition, magnesium salts such as magnesium sulfate or magnesium silicate known as a stabilizer for peroxides or peroxide adducts may be used.

Method of the Production of Granules

There are no limitations to the method for the production of the granule of the present invention. For example, a method in which the component (a) and the component (b) (as required, the component (c) and as further required, the component (d)) are fused and mixed, and then the resulting mixture is granulated by extrusion granulation may be proposed. Particularly, a method in which at least a part of the component (a), component (b) and anionic surfactant is previously mixed to prepare a homogeneous mixture, and thereafter a binder is added is preferably. As the binder, at least one selected from polyoxyethylenes and fatty acids are preferable. As the polyoxyethylene, those having an average molecular weight of 2000 to 20000, preferably 4000 to 10000 and more preferably 4000 to 8000 are preferable. The number of carbon atoms of fatty acid is 8 to 20, preferably 10 to 18 and more preferably 12 to 18. A part or all of the fatty acid may be in the state of sodium or potassium soap. Such a binder is used in the granule in an amount of 0.5 to 30% by weight, preferably 1 to 20% by weight and more preferably 5 to 20% by weight.

As the pelleter used for granulation, an extrusion pelleter is suitable. Specific examples of the extrusion pelleter include "Pelletor Double" (trade mark) and "Twindomegran" (trademark) manufactured by Fuji Paudal Co., Ltd., and a granulating machine manufactured by Kikusui K. K.

With regard to the temperature in the granulation, the extrusion is preferably conducted at temperature close to the melting point of the binder more preferably at the temperatures ranging from the temperature 20° C. higher than the melting point of the binder to the temperature 20° C. lower than the melting point to restrain the generation of a fine powder and to provide proper particle strength. At this time, a proper screen is selected so that the granule has an average particle diameter of 700 $\mu$m to 1500 $\mu$m and the extrusion pressure is controlled so that the bulk density is made to be 0.5 to 0.8 g/ml.

Among other granulation methods, a method of making a tablet by using a briquetting machine may be exemplified as a preferable granulation method.

In the present invention, grading may be carried out as required by, for instance, cracking or globing after granulation. Examples of equipment used for cracking include Flash Mill (trade mark) manufactured by Fuji Paudal Co., Ltd. and Fitz Mill (trade mark) manufactured by Fitzpatrick (USA). As examples of equipment used for globing, a Marumeraizer (trade mark) manufactured by Fuji Paudal Co., Ltd. is exemplified. With regard to the temperature of the granule supplied to the cracking machine, the granule is preferably cooled close to ordinary temperature. For example, when the granule is supplied to a vibrating cooler, cooled to a given temperature and thereafter cracked, adhesion of cracked materials in the cracking machine can be restrained. Also, the cracked material may be further classified to reduce fine powders generated by cracking and globing and crude powders which have been insufficiently cracked and globed.

Examples of the granulated bleaching activator of the present invention include a granulated bleaching activator comprising (a) 50–96% by weight of a bleaching activator and (b) 1–10% by weight of an ethylene oxide- and/or propylene oxide- added nonionic surfactant having a melting point less then 20° C., and further include a granule further comprising 0.1–10% by weight of a solid or powder acid as the component Bleaching Agent The bleaching agent of the present invention comprises the granulated bleaching activator (I) containing the above-mentioned components (a) and (b), and an inorganic peroxide (II).

Inorganic Peroxide

Examples of the inorganic peroxide (II) used in the present invention include perborates and percarbonates. Among them, percarbonates are particularly preferable from a viewpoint of environmental safety. When a percarbonate is used in a composition containing zeolite, a percarbonate coated with at least one selected from a paraffin, borate, perborate, ethylene oxide adduct of alcohol, polyethylene glycol and silicic acid compound is preferable. (III) Particle including surfactant In the present invention, particles including surfactant may be incorporated into the bleaching agent to provide washing ability. As examples of the surfactant include anionic surfactants, nonionic surfactants, amphoteric surfactants and cationic surfactants. Specifically, examples of the surfactant include anionic surfactants such as alkylbenzene sulfonates, alkyl sulfates, alkyl ether sulfates, olefin sulfonates, alkane sulfonates, fatty acid salts, alkyl or alkenyl ether carboxylates and α-sulfofatty acid salts or esters thereof, nonionic surfactants such as polyoxyethylenes or polyoxypropylenes or copolymers thereof, polyoxyethylenealkyl or polyoxyethylenealkenyl ethers, polyoxyethylenealkyl phenyl ethers, higher fatty acid alkanolamide or alkyleneoxide adducts thereof, cane sugar fatty acid ester and alkyl glycosides, amphoteric surfactants such as amine oxides, sulfobetaines and carbobetaines and cationic surfactants such as quaternary ammonium salts. The surfactant is incorporated in an amount of preferably 10 to 60% by weight and particularly preferably 20 to 50% by weight in the particles including surfactant (III).

The bleaching agent of the present invention comprises the granulated bleaching activator (I) in an amount of 1 to 30% by weight and preferably 3 to 20% by weight, and the inorganic peroxide (II) in an amount of 20 to 95% by weight and preferably 30 to 90% by weight. The percentage composition when the particles including surfactant (III) is incorporated is as follows: the granulated bleaching activator (I): 0.5 to 10% by weight and preferably 1 to 8% by weight, the inorganic peroxide (II): 0.5 to 20% by weight and preferably 1 to 10% by weight, and the particles including surfactant (III): 0.5 to 50% by weight and preferably 5 to 40% by weight.

Moreover, in the present invention, preferably the ratio of the granulated bleaching activator (I) to the inorganic peroxide (II), namely (I)/(II) is 2/1 to 1/20 and particularly 1/1 to 1/15 from a viewpoint of bleaching effect.

In the present invention, sodium carbonate may be incorporated in an amount of 1 to 50% by weight and preferably 5 to 40% by weight in the bleaching agent. Examples of the sodium carbonate, light ashes and dense ashes may be proposed. In the present invention, dense ashes having an average particle diameter of 300±200 μm and particularly 300±100 μm are preferred.

In the present invention, a crystalline aluminosilicate such as zeolite A, X and P may be incorporated in the bleaching agent in an amount of 0 to 40% by weight and more preferably 1 to 40% by weight to improve the bleaching washing effect. Zeolite A is particularly preferable. An average primary-particle diameter thereof is preferably 0.1 to 10 μm and particularly preferably 0.1 to 5 μm.

In the present invention, a metal-sequester may be incorporated into the bleaching agent in an amount of 0.0005 to 30% by weight and more preferably 0.01 to 15% by weight, to improve the stability of the inorganic peroxide. Examples of the metal-sequester include (1) phosphoric acid compounds such as phytic acid, or salts thereof, (2) phosphonic acids such as ethane-1,1-diphosphonic acid, ethane-1,1,2-triphosphonic acid, ethane-1-hydroxy-1,1-diphosphonic acid or derivatives thereof, ethanehydroxy-1,1,2-triphosphonic acid, ethane-1,2-dicarboxy-1,2-diphosphonic acid and methanehydroxyphosphonic acid or salts thereof, (3) phosphonocarboxylic acids such as 2-phosphonobutane-1,2-dicarboxylic acid, 1-phosphonobutane-2,3,4-tricarboxylic acid and α-methylphosphonosuccinic acid or salts thereof, (4) amino acids such as aspartic acid, glutamic acid and glycine, or salts thereof, (5) aminopolyacetic acids such as nitrilotriacetic acid, iminodiacetic acid, ethylenediaminetetraacetic acid, diethylenetriaminepentaacetic acid, glycol ether diamine tetraacetic acid, hydroxyethyliminodiacetic acid, triethylenetetraaminehexaacetic acid and diene col acid or salts thereof, (6) organic acids such as diglycolic acid, oxydisuccinic acid, carboxymethyloxysuccinic acid, citric acid, lactic acid, tartaric acid, oxalic acid, malic acid, gluconic acid, carboxymethylsuccinic acid and carboxymethyltartaric acid or salts thereof and (7) aminopoly (methylenephosphonic acid) or polyethylenepolyaminepoly (methylenephosphonic acid) or salts thereof.

Among these compounds, at least one selected from the group consisting of the above (2), (5) and (6) are preferable, and the above (2) and (5) are particularly preferable.

In the present invention, an enzyme such as protease, cellulase, pectinase, amylase and lipase may be incorporated into the bleaching agent to improve the bleaching effect. In particular, it is preferable to use at least one of protease and cellulase. Examples of cellulase include bacterial cellulase and mycotic cellulase with those having an optimum pH particularly between pH 5 to pH 9.5 being preferable. For instance, the enzymes described in JP-A 63-264699, page 4, right upper column, line 13 to page 5, right lower column, line 12 maybe used. Among these enzymes, particularly alkali cellulase produced by alkaliphilic microorganism Bacillus SP KSM-635 (FERM BP-1485) or its mutant is preferably used. Also, cellulase described in JP-A 8-53699 may be used. More specifically, enzymatic granules such as KAC-500 (trademark) manufactured by Kao Corp. and Celluzyme (trademark) manufactured by Novo Nordisc may be typified. As protease, alkali protease having an optimum pH of 8 or more and preferably 8 to 11 is preferable. For example, Alkalase and Sabinase (trademark, manufactured by Novo Nordisc), Plafect (trademark, manufactured by Zenenco) and KAP4.3G and KAP11.1G (trademark, manufactured by Kao Corp.) maybe exemplified. Particularly, KAP4.3G and KAP11.1G are excellent. The enzyme is incorporated into the bleaching agent in an amount of 0.005 to 3% by weight and preferably 0.01 to 2% by weight as a raw powder in view of washing effect. When protease is used together with cellulase, the ratio by weight of protease to cellulase is 1/50 to 1/1 and preferably 1/30 to 1/2 as a raw powder.

It is to be noted that these optional components may be incorporated into the granule (I) and/or the particles including surfactant (III), or may be separately incorporated by after-blending. The particles including surfactant (III) may contain a bleaching activator. In this case, it is preferable that the bleaching activator be incorporated in the particles in an amount of less than 40% by weight, further 10% by weight or less and substantially zero in particular.

Examples of the bleaching agent of the present invention include a bleaching agent containing the granulated bleaching activator (I) containing (a) at least one selected from an alkanoyl- or alkenoyl-oxybenzenecarboxylic acid having 8 to 14 carbon atoms in the alkanoyl or alkenoyl group or a salt thereof and an alkanoyl- or alkenoyl-oxybenzenesulfonate having 8 to 14 carbon atoms in the alkanoyl or alkenoyl group and (b) an nonionic surfactant fulfilling the requirements (1) and (2) described below in the weight ratio (a)/(b) of 15/1 to 70/1, and the inorganic peroxide (II):

(1) when 0.1 g of the component (a) is added to an aqueous solution produced by dissolving 10 g of the component (b) in 500 ml of water at 10° C. and the mixture was stirred for five minutes, the solubility of the component (a) just after the stirring is 50% by weight or more; and (2) when 0.1 g of the component (a) is added to an aqueous solution produced by dissolving 0.25 g of the component (b) in 500 ml of water at 10° C. and the mixture was stirred for five minutes, the solubility of the component (a) just after the stirring is 20% by weight or less.

Moreover, among the above bleaching agents, a bleaching agent in which the component (b) is a polyoxyalkylenealkyl or polyoxyalkylenealkenyl ether represented by the following formula (i) is typified.

$$RO—(PO)_m—(EO)_n—H \qquad (i)$$

wherein R represents a C10-18 alkyl or alkenyl group, m and n independently represent a number of from 1 to 20, PO represents a propyleneoxy group and EO represents an ethyleneoxy group, provided that PO and EO may be added in block and at random.

Moreover, the above-mentioned bleaching agent comprising the particles including surfactant (III) may be proposed.

EXAMPLES

All "%" in Examples are by weight, unless otherwise noted.

Example 1

9.88 kg of a bleaching activator (unreacted products (0.1–2% of $C_{2-14}$ fatty acid) and the like were contained in the production step, hereinafter abbreviated as "bleaching activator (a)") represented by the formula (A), 0.39 kg of succinic acid (succinic acid (20 mesh-pass product), manufactured by Kawasaki Kasei Chemicals, hereinafter abbreviated "succinic acid"), 2.21 kg of polyethylene glycol (K-PEG6000, manufactured by Kao Corp., hereinafter abbreviated as "PEG6000") and 0.52 kg of Emulgen KS-108 (manufactured by Kao Corp., melting point: −9° C., hereinafter abbreviated as "E-KS-108") were fed in the amount of 13 kg/Batch into a mixer (Nautor Mixer NX-S model, manufactured by Hosokawa Micron). The contents were mixed and heated at a jacket temperature of 80° C., an automatic rotation speed of 121 r/min and a revolution speed of 5.5 r/min. When the temperature of the resulting powder reached 75° C., the mixture was taken out. Then, the resulting mixture was extruded through a screen having an opening diameter of 900 μm with an extrusion pelleter (Pelleter Double Type EXD-60, manufactured by Fuji Paudal Co., Ltd.) to compressed the mixture.

The resulting extrudate was cooled with a vibrating cooler (Vibro/Flow Dryer Type VDF/6000, manufactured by Fuji Paudal Co., Ltd.) and then reduced into finer particles with a particle size regulator (Flash Mill Type FL-200, manufactured by Fuji Paudal Co., Ltd.). The resulting particles were classified by using a classifier (Kotobuki Cycle type Vibrating Screen, manufactured by Tokuzyu Seisakusho) to give a granulated bleaching activator having a particle diameter of 350 to 410 μm.

(A)

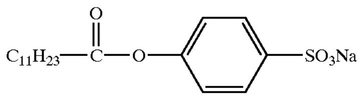

Example 2

The same procedures as in Example 1 were carried out, except that the amount of the bleaching activator (a) to be added was altered to 10.01 kg and 0.39 kg of Emulgen 507 (manufactured by Kao Corp., melting point: 15° C., hereinafter abbreviates as "E-507") was used in place of E-KS-108, to give a granulated bleaching activator having a particle diameter of 350 to 1410 μm.

Example 3

The same procedures as in Example 1 were carried out, except that 2.21 kg of polyethylene glycol (Nissan Polyethylene Glycol#4000, manufactured by Nippon Oil & Fats, hereinafter abbreviated as "PEG4000") was used in place of PEG6000 and 0.39 kg of citric acid (Citric Acid (absolute) M, manufactured by Kyushu Kako) was used in place of succinic acid, to give a granulated bleaching activator having a particle diameter of 350 to 1410 μm.

Example 4

The same procedures as in Example 1 were carried out, except that 9.88 kg of tetraacetylethylenediamine (hereinafter abbreviated as "TAED") was added in place of the bleaching activator (a), to give a granulated bleaching activator having a particle diameter of 350 to 1410 μm.

Example 5

The same procedures as in Example 1 were carried out, except that the amount of the bleaching activator (a) to be added was altered to 8.84 kg, the amount of E-KS-108 to be added was altered to 0.26 kg and 1.3 kg of sodium lauryl sulfate (Emal 10 Powder, manufactured by Kao Corp., hereinafter abbreviated as "E-10P") was used as other components, to give a granulated bleaching activator having a particle diameter of 350 to 1410 μm.

Comparative Example 1

The same procedures as in Example 1 were carried out, except that the amount of the bleaching activator (a) to be added was altered to 10.335 kg and the amount of E-KS-108 to be added was altered to 0.065 kg, to give a granulated bleaching activator having a particle diameter of 350 to 1410 μm.

Comparative Example 2

The same procedures as in Example 1 were carried out, except that 0.52 kg of Emulgen 123P (an adduct of $C_{12}$ alcohol with 22 mols of EO, manufactured by Kao Corp., melting point: 34° C., hereinafter abbreviated as "E-123P") was used in place of E-KS-108, to give a granulated bleaching activator having a particle diameter of 350 to 1410 μm.

Test Example

Each solubility (generating rate of peroxides) of the granules obtained in Examples 1 to 5 and Comparative Examples 1 and 2 was evaluated according to the following test method. The results are shown in Table 1.

Method of Measurement of Generating Rate of Peroxides

The granulated bleaching activator was dissolved in a solution, produced by dissolving 0.3 g of sodium percarbonate and 0.3 g of an anionic detergent having the composition shown below in 75 ml of tap water, such that the bleaching activator is 1/16 equivalents to hydrogen peroxide contained in the sodium percarbonate. The mixture was reacted at 20° C. for 3 minutes and thereafter 2.5 ml of a 0.3% catalase solution was added thereto, followed by stirring for one minute. Thereafter, 10 ml of 20% sulfuric acid and a 10% potassium iodide solution were added to the resulting mixture, and then the mixture was titrated with 0.1N sodium thiosulfate. The generating ratio of peroxide was determined according to the following formula. Anionic detergent

| | |
|---|---|
| Sodium linear alkylbenzene sulfonate (having 12 to 13 carbon atoms) | 25% |
| Sodium alkyl sulfate (having 14 to 15 carbon atoms) | 8% |
| Sodium carbonate | 20% |
| Sodium sulfonate | for balance to make the total 100% |

$$\frac{\left[\dfrac{(\text{Titration amount of sodium thiosulfate (ml)}/1000)\times 0.8}{\text{Effective bleaching activator (g)}}\right]}{\text{Amount of theoretically effective oxigen (mol)}}\times 100$$

Examples 6–11 and Comparative Examples 3–10

Preparation of Granulated Bleaching Activator

Granulated Bleaching activator having the compositions shown in Table 2 were prepared by using the bleaching activator A-1 and nonionic surfactants B-1 and B-2 described below according to the method described below. Also, granulated bleaching activators were prepared in the same manner as above by using B'-1, B'-2 and B'-3 as comparative nonionic surfactants. Each solubility of these nonionic surfactants in the conditions (1) and (2) are shown below.

A-1: Sodium dodecanoyloxybenzene sulfonate (bulk density: 0.4 g/ml, particles having a grain size of 125 μm or more: 5.2%).

B-1: $C_{12}H_{25}O$—$(EO)_5$—$(PO)_2$—$(EO)_5$—H (Condition (1): 79%, Condition (2): 7%, melting point: −1.5° C.).

B-2: $C_{12}H_{25}O$—$(EO)_{10}$—$(PO)_4$—H (Condition (1): 81%, Condition (2): 0.5%, melting point: 5° C.).

B'-1: $C_{12}H_{25}O$—$(EO)_7$—H (Condition (1): 82%, Condition (2): 32%, melting point: 15° C.).

B'-2: an adduct of $C_{12}$–$C_{14}$ secondary alcohol with 7 mols of EO added thereto (Condition (1): 47%, Condition (2): 18%, melting point: −5° C.).

B'-3: $C_{12}H_{25}O$—$(EO)_{15}$—H (Condition (1): 46%, Condition (2): 3%, melting point: 32° C.).

Method of the Preparation of Granulated Bleaching Activator

Sodium lauryl sulfate, a nonionic surfactant, a polyoxyethylene (molecular weight: 8000), bleaching activator, succinic acid and ultramarine blue were fed into a high-speed mixer (Type FS-GC-10, manufactured by Fukae Kogyo K. K.). The contents were mixed and heated at a rotational speed of the shaft of 200 rpm and a rotational speed of granulating blades of 1500 rpm. The resulting powder was taken out when the temperature thereof reached 70° C. Then the resulting mixture was extruded through a screen having an opening diameter of 900 μm with an extrusion pelleter (Pelleter Double Type EXD-100, manufactured by Fuji Paudal Co., Ltd.) (the temperature of the powder in the pelleter was 64° C.). The resulting extrudate was cooled with a vibrating cooler (Vibro/Flow Dryer Type VDF/6000, manufactured by Fuji Paudal Co., Ltd.) and then reduced into finer particles with a particle size regulator (knife cutter Type FL-200, manufactured by Fuji Paudal Co., Ltd.). The resulting particles were classified to give a granulated bleaching activator having an average particle diameter of 900 μm.

Inorganic Peroxide (1) Coated Sodium Percarbonate

Sodium percarbonate (5% coat) coated with sodium methaborate tetrahydride was produced based on Example 1 of JP-A 59-196399 (peroxide II-1).

(2) Sodium Percarbonate Manufactured by Nippon Peroxide was Used (peroxide II-2).

Preparation of Particles Including Surfactant

An aqueous slurry having a solid content of 50% was prepared from 2000 g of a sodium linear alkylbenzenesulfonate, 500 g of sodium lauryl sulfate, 300 g of polyoxyethylene alkyl ether (Emulgen 510L, manufactured by Nippon Shokubai Kagaku Kogyo Co., Ltd.), 300 g of an acrylic acid/maleic acid copolymer (Sokalan cp-5, manufactured by BASF AG), 300 g of sodium salt of fatty acid (beef tallow), 600 g of sodium carbonate, 1500 g of No. 1 silicate, 1500 g of zeolite 4A, sodium sulfate for balancing and 100 g of PEG. The slurry was spray-dried (drying temperature: 190° C.) to prepare particles, which were fed into a high-speed mixer (Type FS-GC-10, manufactured by Fukae Kogyo K. K.), to which were further added 500 g of polyoxyethylene lauryl ether (the number of mols of EO to be added: 8) and 1500 g of zeolite 4A. Then, the mixture was granulated to give particles including surfactant having an average particle diameter of 430 μm and a bulk density of 780 g/L.

Preparation of a Bleaching Agent

The above-mentioned granulated bleaching activator, an inorganic peroxide, particles including surfactant and the components C-1 to D-1 described below were used to prepare bleaching agents shown in Tables 3 and 4. These bleaching agents were evaluated for the generating ratio of peroxides and bleaching washing ability. The results are shown in Tables 3 and 4.

C-1: Alkali cellulase (KAC 500, manufactured by Kao Corp.)

C-2: Alkali protease (KAP 4.3G, manufactured by Kao Corp.)

D-1: Sodium carbonate (dense ash, average particle diameter: 280 μm)

Measurement of the Generating Ratio of Peroxides 1 l glass beaker (cylinder type with an inside diameter of 105 mm and a height of 15 cm) provided with a cylinder stirrer piece having a diameter of 10 mm and a length of 30 mm was charged with 1 l of 25° C. ion exchange water, followed by stirring at 100 rpm. Each of the bleaching agents shown in Tables 3 and 4was added thereto at a time in such an amount that the amount of the bleaching activator was 0.1% by weight. 10 ml of an aqueous 0.3% catalase solution was added to the mixture, followed by stirring for further one minute and the concentration of the generated organic peroxide was measured by iodometric titration. The results are shown in Tables 3 and 4.

Measurement of Bleaching Ability

Each of the bleaching agents shown in Tables 3 and 4 was dissolved in 500 ml of 20° C. tap water such that the concentration of the bleaching activator was 0.1% by weight. Five strips, per one shot of test, of cloth soiled with curry (lipophilic soil) prepared in the following manner were soaked for 30 minutes. Then, the soiled cloth was then rinsed with tap water and dried. The bleaching rate was calculated by the following formula.

$$\text{Rate of bleaching (\%)} = \frac{\text{Reflectivity after bleaching} - \text{Reflectivity before washing}}{\text{Reflectivity of unstained cloth} - \text{Reflectivity before bleaching}} \times 100$$

The reflectivity was measured by using 460 nm filter of NDR-10DP (manufactured by Nippon Denshoku Kogyo).

Preparation of Cloth Stained with Curry

After the solid content of retort curry (curry marche) manufactured by House Food Industrial) was removed using a mesh, the resulting solution was heated until it was boiled. A cotton shirting cloth #2003 was soaked in the solution and boiled for about 15 minutes. Taken from the fire, the solution was allowed to stand for about 2 hours until the temperature thereof was lowered to room temperature. Thereafter, the cloth was taken out and an excessive curry solution stuck to the cloth was removed by a spatula. The cloth was air-dried, followed by pressing and subjected to an experiment as a test piece of 10 cm×10 cm.

The present invention ensures that a granulated bleaching activator having high solubility can be obtained. Also, according to the present invention, a bleaching agent having a high bleaching effect even in soak washing when the concentration of a bleaching activator is high can be provided.

TABLE 1

| | | Example | | | | | Comparative Example | |
|---|---|---|---|---|---|---|---|---|
| | | 1 | 2 | 3 | 4 | 5 | 1 | 2 |
| Kind of the component (a)*1 | | (A) | (A) | (A) | TAED | (A) | (A) | (A) |
| Kind of the component (b) | | E-KS-108 | E-507 | E-KS-108 | E-KS-108 | E-KS-108 | E-KS-108 | — |
| m.p. (° C.) | | −9 | 15 | −9 | −9 | −9 | −9 | |
| Kind of the component (c) | | Succinic acid | Succinic acid | Citric acid | Succinic acid | Succinic acid | Succinic acid | Succinic acid |
| Kind of the component (d) | | PEG6000 | PEG6000 | PEG4000 | PEG6000 | PEG6000 | PEG6000 | PEG6000 |
| Kind of the other component | | — | — | — | — | E-10P | — | E-123P m.p. 34° C. |
| Composition of the granule (%) | the component (a) | 76 | 77 | 76 | 76 | 68 | 79.5 | 76 |
| | the component (b) | 4 | 3 | 4 | 4 | 2 | 0.5 | 0 |
| | the component (c) | 3 | 3 | 3 | 3 | 3 | 3.0 | 3 |
| | the component (d) | 17 | 17 | 17 | 17 | 17 | 17.0 | 17 |
| | the other component | 0 | 0 | 0 | 0 | 10 | 0 | 4 |
| Solubility (the generating ratio of peroxides) (%) | | 72 | 63 | 68 | 58 | 69 | 32 | 24 |

Note)
*1: (a) represents the bleaching activator (a).

TABLE 2

| | Granulated bleaching activator | | | | | | |
|---|---|---|---|---|---|---|---|
| | I-1 | I-2 | I-3 | I-4 | I-5 | I-6 | I-7 |
| Component incorporated (g) | | | | | | | |
| A-1 | 3500 | 3500 | 3500 | 3500 | 3500 | 3500 | 3500 |
| B-1 | 250 | 60 | — | — | — | 40 | — |
| B-2 | — | — | 250 | — | — | — | — |
| B'-1 | — | — | — | 250 | — | — | — |
| B'-2 | — | — | — | — | 250 | — | — |
| B'-3 | — | — | — | — | — | — | 250 |
| Ultramarine blue | — | — | 15 | — | — | — | — |
| Sodium laurylsulfate | 650 | 650 | 650 | 650 | 650 | 650 | 650 |
| Polyoxyethylene | 500 | 690 | 485 | 500 | 500 | 710 | 500 |
| Succinic acid | 100 | 100 | 100 | 100 | 100 | 100 | 100 |
| Total | 5000 | 5000 | 5000 | 5000 | 5000 | 5000 | 5000 |
| Weight ratio A/B | 14/1 | 58/1 | 14/1 | 14/1 | 14/1 | 88/1 | 14/1 |

TABLE 3

| | Example | | | Comparative Example | | | |
|---|---|---|---|---|---|---|---|
| | 6 | 7 | 8 | 3 | 4 | 5 | 6 |
| Granulated bleaching activator | | | | | | | |
| I-1 | 10 | | | | | | |
| I-2 | | 10 | | | | | |
| I-3 | | | 10 | | | | |
| I-4 | | | | 10 | | | |
| I-5 | | | | | 10 | | |
| I-6 | | | | | | 10 | |
| I-7 | | | | | | | 10 |
| Peroxide II-2 | 60 | 60 | 60 | 60 | 60 | 60 | 60 |
| (C-2) | 0.5 | 0.5 | 0.5 | 0.5 | 0.5 | 0.5 | 0.5 |
| (D-1) | 29.5 | 29.5 | 29.5 | 29.5 | 29.5 | 29.5 | 29.5 |
| The generating rate of the peroxide (%) | 82 | 52 | 85 | 24 | 28 | 44 | 32 |
| Bleaching and washing ability (%) | 72 | 60 | 75 | 43 | 47 | 51 | 48 |

TABLE 4

| | Example | | | Comparative Example | | | |
|---|---|---|---|---|---|---|---|
| | 9 | 10 | 11 | 7 | 8 | 9 | 10 |
| Granulated bleaching activator | | | | | | | |
| I-1 | 5 | | | | | | |
| I-2 | | 5 | | | | | |
| I-3 | | | 5 | | | | |
| I-4 | | | | 5 | | | |
| I-5 | | | | | 5 | | |
| I-6 | | | | | | 5 | |
| I-7 | | | | | | | 5 |
| Peroxide II-1 | 10 | 10 | 10 | 10 | 10 | 10 | 10 |
| Particles including surfactant | 80 | 80 | 80 | 80 | 80 | 80 | 80 |
| (C-1) | 0.5 | 0.5 | 0.5 | 0.5 | 0.5 | 0.5 | 0.5 |
| (C-2) | 0.5 | 0.5 | 0.5 | 0.5 | 0.5 | 0.5 | 0.5 |
| Sodium sulfate | 4 | 4 | 4 | 4 | 4 | 4 | 4 |
| The generating rate of the peroxide (%) | 75 | 61 | 79 | 35 | 38 | 52 | 39 |
| Bleaching and washing ability (%) | 75 | 63 | 74 | 52 | 56 | 58 | 57 |

What is claimed is:

1. A granulated bleaching activator comprising:

(a) 30–96% by weight of a bleaching activator and (b) 1–10% by weight of at least one nonionic surfactant that is a polyoxyalkylenealkyl or polyoxyalkylenealkenyl ether represented by the following formula (i):

$$RO—(PO)_m—(EO)_n—H \quad (i)$$

wherein R represents a $C_{10-18}$ alkyl or alkenyl group, m and n independently represent a number of from 1 to 20, PO represents propyleneoxy group and EO represents ethyleneoxy group, provided that PO and EO may be added in block or at random.

2. The granulated bleaching activator as claimed in claim 1, wherein the component (a) is at least one selected from the group consisting of an alkanoyl- or alkenoyl-oxybenzenecarboxylic acid having 8 to 14 carbon atoms in the alkanoyl or alkenoyl group or a salt thereof and an alkanoyl or alkenoyl-oxybenzene sulfonate having 8 to 14 carbon atoms in the alkanoyl or alkenoyl group.

3. A bleaching agent comprising the granulated bleaching activator (I) as defined in claim 1 and an inorganic peroxide (II).

4. The bleaching agent as claimed in claim 3, wherein the weight ratio of (a) to (b) is in the range of 15/1 to 70/1.

5. The bleaching agent as claimed in claim 3 or 4, wherein the component (a) is at least one selected from the group consisting of an alkanoyl- or alkenoyl-oxybenzenecarboxylic acid having 8 to 14 carbon atoms in the alkanoyl or alkenoyl group or a salt thereof and an alkanoyl- or alkenoyl-oxybenzene sulfonate having 8 to 14 carbon atoms in the alkanoyl or alkenoyl group.

6. The bleaching agent as claimed in any of claims 3 to 4, which further comprises (III) particles including a surfactant.

* * * * *